US012058584B2

(12) United States Patent
Jenkins et al.

(10) Patent No.: US 12,058,584 B2
(45) Date of Patent: *Aug. 6, 2024

(54) SYSTEM AND METHOD FOR GENERATING A RECOMMENDATION ON A MOBILE DEVICE

(71) Applicant: III Holdings 2, LLC, Wilmington, DE (US)

(72) Inventors: Andrew Jenkins, Charlotte, NC (US); Jeff Rayfield, Charlotte, NC (US)

(73) Assignee: III Holdings 2, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,132

(22) Filed: Apr. 11, 2023

(65) Prior Publication Data

US 2023/0292082 A1    Sep. 14, 2023

Related U.S. Application Data

(63) Continuation of application No. 17/743,894, filed on May 13, 2022, now Pat. No. 11,653,174, which is a
(Continued)

(51) Int. Cl.
*H04W 4/021* (2018.01)
*G06F 16/29* (2019.01)
(Continued)

(52) U.S. Cl.
CPC ............ *H04W 4/021* (2013.01); *G06F 16/29* (2019.01); *G06F 16/90324* (2019.01);
(Continued)

(58) Field of Classification Search
CPC ..... H04W 8/18–205; H04W 88/00–06; H04M 1/72457; G06F 16/19; G06F 16/90324; G06Q 30/0261
See application file for complete search history.

(56) References Cited

U.S. PATENT DOCUMENTS

| 4,850,891 A | 7/1989 | Walkup et al. |
| 5,495,533 A | 2/1996 | Linehan et al. |
| (Continued) | | |

FOREIGN PATENT DOCUMENTS

| EP | 0 859 314 | 8/1998 |
| WO | WO1999015999 | 4/1999 |
| WO | WO2009075760 | 6/2009 |

OTHER PUBLICATIONS

PCT Search Report, Feb. 12, 2009, PacketVideo Corp.
(Continued)

*Primary Examiner* — San Htun
(74) *Attorney, Agent, or Firm* — Crowell & Moring LLP

(57) ABSTRACT

A system and a method generate a recommendation on a mobile device. The system and the method may use a time, a location, a venue and/or an event to generate the recommendation. Further, the system and the method may use an event database to determine current interests of the user. Still further, the system and the method for generating a recommendation on a mobile device may use a transactional history of the user and/or behavior of other users to generate the recommendation. The system and the method may recommend, for example, digital media, news and event information, editorial content and/or physical or digital merchandise. As a result, the system and the method may generate a recommendation that corresponds to the current interests of the user.

20 Claims, 1 Drawing Sheet

Related U.S. Application Data continuation of application No. 16/926,186, filed on Jul. 10, 2020, now Pat. No. 11,363,404, which is a continuation of application No. 15/350,253, filed on Nov. 14, 2016, now Pat. No. 10,715,955, which is a continuation of application No. 13/775,991, filed on Feb. 25, 2013, now Pat. No. 9,497,583, which is a continuation of application No. 13/302,193, filed on Nov. 22, 2011, now Pat. No. 8,417,263, which is a continuation of application No. 12/315,536, filed on Dec. 4, 2008, now Pat. No. 8,095,153.

(60) Provisional application No. 61/007,343, filed on Dec. 12, 2007.

(51) Int. Cl.
| | |
|---|---|
| *G06F 16/9032* | (2019.01) |
| *G06Q 30/0251* | (2023.01) |
| *H04M 1/72457* | (2021.01) |
| *H04W 4/02* | (2018.01) |
| *H04W 4/029* | (2018.01) |
| *H04W 4/23* | (2018.01) |
| *H04W 4/35* | (2018.01) |

(52) U.S. Cl.
CPC .... *G06Q 30/0261* (2013.01); *H04M 1/72457* (2021.01); *H04W 4/02* (2013.01); *H04W 4/023* (2013.01); *H04W 4/025* (2013.01); *H04W 4/029* (2018.02); *H04W 4/23* (2018.02); *H04W 4/35* (2018.02)

(56) References Cited

U.S. PATENT DOCUMENTS

| | | | |
|---|---|---|---|
| 5,732,077 | A | 3/1998 | Whitehead |
| 5,790,848 | A | 8/1998 | Wlaschin |
| 5,801,985 | A | 9/1998 | Roohparvar et al. |
| 5,862,325 | A | 1/1999 | Reed |
| 5,930,167 | A | 7/1999 | Lee et al. |
| 6,141,682 | A | 10/2000 | Barker |
| 6,167,092 | A | 12/2000 | Lengwehasatit |
| 6,182,287 | B1 | 1/2001 | Schneidewent |
| 6,304,969 | B1 | 10/2001 | Wasserman |
| 6,407,680 | B1 | 6/2002 | Lai |
| 6,429,812 | B1 | 8/2002 | Hoffberg |
| 6,498,865 | B1 | 12/2002 | Brailean |
| 6,529,552 | B1 | 3/2003 | Tsai |
| 6,647,269 | B2 | 11/2003 | Hendrey |
| 6,804,717 | B1 | 10/2004 | Bakshi |
| 6,865,600 | B1 | 5/2005 | Brydon |
| 6,941,324 | B2 | 9/2005 | Plastina |
| 7,006,631 | B1 | 2/2006 | Luttrell |
| 7,013,149 | B2 | 3/2006 | Vetro |
| 7,035,854 | B2 | 4/2006 | Hsaio et al. |
| 7,127,633 | B1 | 10/2006 | Olson et al. |
| 7,139,279 | B2 | 11/2006 | Jabri |
| 7,243,351 | B2 | 7/2007 | Kundu |
| 7,283,045 | B1 | 10/2007 | Manz |
| 7,568,199 | B2 | 7/2009 | Bozak et al. |
| 7,685,602 | B1 | 3/2010 | Tran et al. |
| 7,822,808 | B2 | 10/2010 | Caplan |
| 7,917,130 | B1 | 3/2011 | Christensen |
| 8,095,153 | B2 | 1/2012 | Jenkins et al. |
| 8,196,133 | B2 | 6/2012 | Kakumani et al. |
| 8,417,263 | B2 | 4/2013 | Jenkins et al. |
| 8,726,278 | B1 | 5/2014 | Shawver et al. |
| 9,497,583 | B2 | 11/2016 | Jenkins et al. |
| 10,715,955 | B2 | 7/2020 | Jenkins et al. |
| 11,363,404 | B2 | 6/2022 | Jenkins et al. |
| 11,653,174 | B2 | 5/2023 | Jenkins et al. |
| 2002/0002044 | A1 | 1/2002 | Naruse |
| 2002/0032716 | A1 | 3/2002 | Nagato |
| 2002/0059094 | A1 | 5/2002 | Hosea et al. |
| 2002/0068583 | A1 | 6/2002 | Murray |
| 2002/0090934 | A1 | 7/2002 | Mitchelmore |
| 2002/0111154 | A1* | 8/2002 | Eldering ............ H04M 3/4872 455/414.1 |
| 2002/0111172 | A1 | 8/2002 | DeWolf |
| 2002/0161627 | A1 | 10/2002 | Gailey |
| 2002/0176559 | A1 | 11/2002 | Adamek |
| 2003/0018521 | A1 | 1/2003 | Kraft et al. |
| 2003/0048855 | A1 | 3/2003 | Klaghofer |
| 2003/0093267 | A1 | 3/2003 | Leichtling |
| 2003/0067872 | A1 | 4/2003 | Harrell |
| 2003/0088463 | A1 | 5/2003 | Kanevsky |
| 2003/0104820 | A1 | 6/2003 | Greene |
| 2003/0126013 | A1 | 7/2003 | Shand |
| 2003/0140343 | A1 | 7/2003 | Falvo |
| 2003/0142744 | A1 | 7/2003 | Wu |
| 2003/0154112 | A1 | 8/2003 | Neiman et al. |
| 2003/0229900 | A1 | 12/2003 | Reisman |
| 2004/0015973 | A1 | 1/2004 | Skovira |
| 2004/0068536 | A1 | 4/2004 | Demers |
| 2004/0070678 | A1 | 4/2004 | Toyama |
| 2004/0077313 | A1 | 4/2004 | Oba |
| 2004/0083133 | A1 | 4/2004 | Nicholas |
| 2004/0088369 | A1 | 5/2004 | Yaeger |
| 2004/0093281 | A1 | 5/2004 | Silverstein |
| 2004/0116067 | A1 | 6/2004 | Karaoguz |
| 2004/0137886 | A1 | 7/2004 | Ross |
| 2004/0158645 | A1 | 8/2004 | Morinaga |
| 2004/0174817 | A1 | 9/2004 | Jabri |
| 2004/0193762 | A1 | 9/2004 | Leon |
| 2004/0218673 | A1 | 11/2004 | Wang |
| 2004/0225509 | A1 | 11/2004 | Andre |
| 2005/0008030 | A1 | 1/2005 | Hoffman |
| 2005/0028208 | A1 | 2/2005 | Ellis |
| 2005/0095981 | A1 | 5/2005 | Benco |
| 2005/0097595 | A1 | 5/2005 | Lipsanen |
| 2006/0008256 | A1 | 1/2006 | Khedouri |
| 2006/0010472 | A1 | 1/2006 | Godeny |
| 2006/0013148 | A1 | 1/2006 | Burman et al. |
| 2006/0029041 | A1 | 2/2006 | Jabri |
| 2006/0031883 | A1 | 2/2006 | Ellis |
| 2006/0048157 | A1 | 3/2006 | Dawson et al. |
| 2006/0056336 | A1 | 3/2006 | Dacosta |
| 2006/0056416 | A1 | 3/2006 | Yang |
| 2006/0077055 | A1 | 4/2006 | Basir |
| 2006/0159037 | A1 | 7/2006 | Jabri |
| 2006/0161599 | A1* | 7/2006 | Rosen ............... H04L 67/306 |
| 2006/0161635 | A1 | 7/2006 | Lamkin |
| 2006/0176877 | A1 | 8/2006 | Jabri |
| 2006/0253453 | A1* | 11/2006 | Chmaytelli ........ G06Q 30/0601 |
| 2006/0253481 | A1 | 11/2006 | Guido |
| 2006/0282312 | A1* | 12/2006 | Carlson ............. G06Q 30/0267 705/14.5 |
| 2007/0011050 | A1 | 1/2007 | Klopf |
| 2007/0011277 | A1 | 1/2007 | Neff |
| 2007/0060112 | A1 | 3/2007 | Reimer |
| 2007/0076711 | A1 | 4/2007 | Shuster |
| 2007/0076756 | A1 | 4/2007 | Chan |
| 2007/0093275 | A1 | 4/2007 | Bloebaum |
| 2007/0112935 | A1 | 5/2007 | Espelien |
| 2007/0116036 | A1 | 5/2007 | Moore |
| 2007/0143806 | A1 | 6/2007 | Pan |
| 2007/0156770 | A1 | 7/2007 | Espelien |
| 2007/0186003 | A1 | 8/2007 | Foster |
| 2007/0189275 | A1 | 8/2007 | Neff |
| 2007/0220555 | A1 | 9/2007 | Espelian |
| 2007/0226315 | A1 | 9/2007 | Espelien |
| 2007/0233701 | A1 | 10/2007 | Sherwood |
| 2007/0245399 | A1 | 10/2007 | Espelien |
| 2007/0266047 | A1 | 11/2007 | Cortes |
| 2007/0271366 | A1 | 11/2007 | Demers |
| 2007/0276864 | A1 | 11/2007 | Espelien |
| 2007/0287498 | A1 | 12/2007 | Wang |
| 2007/0288478 | A1 | 12/2007 | Dimaria |
| 2008/0021952 | A1 | 1/2008 | Molinie |
| 2008/0027808 | A1 | 1/2008 | Wilf |
| 2008/0037489 | A1 | 2/2008 | Yitiz |
| 2008/0039967 | A1 | 2/2008 | Sherwood |
| 2008/0086379 | A1 | 4/2008 | Dion et al. |

(56) References Cited

U.S. PATENT DOCUMENTS

| | | |
|---|---|---|
| 2008/0090590 A1 | 4/2008 | Espelien |
| 2008/0147680 A1 | 6/2008 | Mitsuhashi |
| 2008/0154696 A1 | 6/2008 | Spiegelman |
| 2008/0227471 A1 | 9/2008 | Dankar |
| 2008/0306826 A1* | 12/2008 | Kramer .............. G06Q 30/0226 |
| | | 705/14.27 |
| 2009/0076917 A1 | 3/2009 | Jablokov |
| 2011/0179134 A1 | 7/2011 | Mayo et al. |

OTHER PUBLICATIONS

PCT Written Opinion, 2/12/20009, PacketVideo Corp.
Caesar et al., "Design and Implementation of a Routing Control Platform," Usenix, NSDI '05 Paper, Technical Program, obtained from the Internet on Apr. 13, 2021, at URL <https://www.usenix.org/legacy/event/nsdi05/tech/full_papers/caesar/caesar_html> 23 pages.
Bader et al.; "Application"; The International Journal of High Performance Computing Applications, vol. 15, No. ; pp. 181-185; Summer 2001.
Coomer et al.; "Introduction to the Cluster Grid—Part 1"; Sun Microsystems White Paper; 19 pages; Aug. 2002.
Joseph et al.; "Evolution of grid computing architecture and grid adoption models"; IBM System Journal, vol. 43, No. 4; 22 pages; 2004.
Smith et al.; "Grid computing"; MIT Sloan Management Review, vol. 46, Iss. 1.; 5 pages; Fall 2004.
"Microsoft Computer Dictionary, 5th Ed."; Microsoft Press; 3 pages; 2002.
"Random House Concise Dictionary of Science & Computers"; 3 pages; Helicon Publishing; 2004.

* cited by examiner

SYSTEM AND METHOD FOR GENERATING A RECOMMENDATION ON A MOBILE DEVICE

This application is a continuation of U.S. application Ser. No. 17/743,894, filed May 13, 2022, which is a continuation of U.S. application Ser. No. 16/926,186, filed Jul. 10, 2020 (now U.S. Pat. No. 11,363,404), which is a continuation of U.S. application Ser. No. 15/350,253, filed Nov. 14, 2016 (now U.S. Pat. No. 10,715,955), which is a continuation application of U.S. application Ser. No. 13/775,991, filed Feb. 25, 2013 (now U.S. Pat. No. 9,497,583), which is a continuation application of U.S. application Ser. No. 13/302,193, filed Nov. 22, 2011 (now U.S. Pat. No. 8,417,263), which is a continuation of U.S. application Ser. No. 12/315,536, filed Dec. 4, 2008 (now U.S. Pat. No. 8,095,153), which claims the benefit of U.S. Provisional Application No. 61/007,343, filed Dec. 12, 2007.

BACKGROUND OF THE INVENTION

The present invention generally relates to a system and a method for generating a recommendation on a mobile device. More specifically, the present invention relates to a system and a method for generating a recommendation on a mobile device that may use a time, a location, a venue and/or an event to generate the recommendation. Further, the system and the method for generating a recommendation on a mobile device may use an event database to determine the current interests of the user. Still further, the system and the method for generating a recommendation on a mobile device may use a transactional history of the user and/or behavior of other users to generate the recommendation. The system and the method for generating a recommendation on a mobile device may recommend, for example, digital media, news and event information, editorial content and/or physical or digital merchandise. As a result, the system and the method for generating a recommendation on a mobile device may generate a recommendation that corresponds to the current interests of the user.

Mobile digital media is a rapidly growing segment of the entertainment industry made feasible by the prevalence of mobile devices operating on high-speed cellular and wireless networks. Consumers of media on mobile devices are faced with an increasing array of content to consume. Mobile devices are limited in screen space and user input functionality, and users are generally viewing content for short durations. Therefore, proactively directing users toward content that is of interest to them is paramount in making the mobile media experience a successful one.

The rise of e-commerce through online shopping destinations, such as Amazon.com (registered trademark of Amazon.com, Inc.), has generated tremendous interest in the area of item recommendation. Merchants that are able to deploy an accurate recommendation system, typically based on individual and aggregated user purchasing and other information, may greatly increase revenue.

The addition of Global Positioning System (hereinafter "GPS") support to many mobile devices enables a large and growing number of applications that recommend and/or select content based on a location of a user. For example, hand-held and vehicle-based GPS systems may make restaurant recommendations according to the location of the user.

Most existing item recommendation systems do not consider both local time and location information of the user. Thus, the existing item recommendation systems miss important factors that may strongly influence a choice of which mobile media to consume. Conversely, existing location-based services that make recommendations, such as, for example, nearby restaurants, operate using simple selection and sorting criteria, and do not consider such factors as historical behavior of the user or the behavior of other users. Furthermore, no systems correlate local time and location information with a real world event to accurately determine a current environment of the user. For example, the same venue may be used one night for a sporting event and another night for a music performance. A location-based content recommendation system should consider the current environment of the user to avoid making inappropriate recommendations.

A need, therefore, exists for a system and a method for generating a recommendation on a mobile device. Further, a need exists for a system and a method for generating a recommendation on a mobile device that use a time, a location, a venue and/or an event to generate the recommendation. Still further, a need exists for a system and a method for generating a recommendation on a mobile device that use a transactional history of the user and/or behavior of other users to generate the recommendation. Moreover, a need exists for a system and a method for generating a recommendation on a mobile device that use an event database to generate the recommendation based on a specific event.

SUMMARY OF THE INVENTION

The present invention generally relates to a system and a method for generating a recommendation on a mobile device. More specifically, the present invention relates to a system and a method for generating a recommendation on a mobile device that use a time, a location, a venue and/or an event to generate the recommendation. Further, the system and the method for generating a recommendation on a mobile device may use an event database to determine the current interests of the user. Still further, the system and the method for generating a recommendation on a mobile device may use a transactional history of the user and/or behavior of other users to generate the recommendation. The system and the method for generating a recommendation on a mobile device may recommend, for example, digital media, news and event information, editorial content and/or physical or digital merchandise.

The system and the method for generating a recommendation on a mobile device may generate the recommendation based on the current interests of the user. For example, users present at a football game may have an interest in multimedia of football highlights from that day. Users present at a concert of a particular musician may have an interest in multimedia of that particular musician. The current interests of the user may change throughout the day depending on whether the user is at, for example, home, an airport, a shopping center, a concert, a play, a sports bar, a sporting event, a conference and/or the like. The system and the method for generating a recommendation on a mobile device may generate the recommendation based on the current interests of the user. Thus, the system and the method for generating a recommendation on a mobile device may determine the current interests of the user and generate the recommendation accordingly.

In an embodiment of the present invention, a method for generating a recommendation on a mobile device of a user is provided. The method has the steps of determining a first location of the mobile device, and determining a first time and a first date. The first time and the first date correspond to the current time and the current date. The method also has the step of comparing the first location, the first time and the first date to event details of a plurality of scheduled events. The event details specify locations, times and dates of the scheduled events. Further, the method has the step of determining a matching event from the plurality of scheduled events. The location, the time and the date of the matching event correspond to the first location, the first time and the first date. The method also has the step of generating the recommendation. The recommendation is generated at least in part based on the matching event. The recommendation recommends physical merchandise associated with the matching event. Finally, the method has the step of transmitting the recommendation to the mobile device. The mobile device displays the recommendation.

In an embodiment, the first location, the first time and the first date are provided by the mobile device and transmitted to an entity remote from the mobile device. The entity stores the event details in a database of scheduled events wherein the entity remote from the mobile device performs the comparing step and the determining step.

In an embodiment, the first location is determined using a GPS receiver unit of the mobile device.

In an embodiment, the physical merchandise is delivered to a shipping address of the user of the mobile device in response to user input on the mobile device which accepts the recommendation.

In an embodiment, the matching event is a sporting event of a specific sport. The recommendation recommends physical merchandise associated with the specific sport.

In an embodiment, the matching event is a musical performance of a specific musical artist. The recommendation recommends physical merchandise associated with the specific musical artist.

In an embodiment, the recommendation is generated at least in part based on a transactional history of the user of the mobile device. The transactional history identifies transactions of the user of the mobile device when the mobile device was located at the first location.

In an embodiment, the recommendation is generated at least in part based on a transactional history of other mobile device users. The transactional history identifies transactions of the other mobile device users at the first location.

In an embodiment, the recommendation is generated at least in part based on a transactional history of other mobile device users. The transactional history identifies transactions of the other mobile device users when attending events similar to the matching event.

In an embodiment, the recommendation is generated at least in part based on a transactional history of the user of the mobile device. The transactional history identifies merchandise previously purchased by the user.

In an embodiment, the recommendation is generated at least in part based on a transactional history of the user of the mobile device. The transactional history identifies media content previously obtained by the user.

In an embodiment, the method also has the step of completing a purchase transaction based on user input on the mobile device. The physical merchandise is delivered to a shipping address of the user in response to completing the purchase transaction.

In a further embodiment of the present invention, a system for generating a recommendation for a user is provided. The system has a mobile device for which a first location, a first time and a first date are determined. The first time and the first date correspond to the current time and the current date. The first location, the first time and the first date are compared to event details which specify locations, times and dates of a plurality of scheduled events to select a matching event from a plurality of scheduled events. The location, the time and the date of the matching event correspond to the first location, the first time and the first date. The system also has a recommendation generated at least in part based on the matching event. The recommendation recommends physical merchandise associated with the matching event. The recommendation is transmitted to the mobile device and displayed by the mobile device.

In an embodiment, the system also has an entity remote from the mobile device. The entity stores the event details of the plurality of scheduled events in a database. The entity remote from the mobile device receives the first location, the first time and the first date from the mobile device, compares the first location, the first time and the first date to the event details, and determines the matching event.

In an embodiment, the system also has a GPS receiver unit of the mobile device wherein the GPS receiver unit is used to determine the first location.

In an embodiment, the physical merchandise is delivered to a shipping address of the user of the mobile device in response to user input on the mobile device which accepts the recommendation.

In an embodiment, the matching event is a sporting event of a specific sport. The recommendation recommends physical merchandise associated with the specific sport.

In an embodiment, the matching event is a musical performance of a specific musical artist. The recommendation recommends physical merchandise associated with the specific musical artist.

In an embodiment, the recommendation is generated at least in part based on a transactional history of the user of the mobile device. The transactional history identifies transactions of the user of the mobile device when the mobile device was located at the first location.

In an embodiment, the recommendation is generated at least in part based on a transactional history of other mobile device users. The transactional history identifies transactions of the other mobile device users at the first location.

In an embodiment, the recommendation is generated at least in part based on a transactional history of other mobile device users and further wherein the transactional history identifies transactions of the other mobile device users when attending events similar to the matching event.

In an embodiment, the recommendation is generated at least in part based on a transactional history of the user of the mobile device. The transactional history identifies merchandise previously purchased by the user.

In an embodiment, the recommendation is generated at least in part based on a transactional history of the user of the mobile device. The transactional history identifies media content previously obtained by the user.

In an embodiment, the system also has payment information for the user accepted by the mobile device after displaying the recommendation. The physical merchandise is delivered to a shipping address of the user in response to acceptance of the payment information.

In another embodiment of the present invention, a method for generating a recommendation for a first mobile device is provided. The method has the steps of determining a first location of the first mobile device, and determining a transactional history of one or more mobile device users. The transactional history is transactions of the one or more mobile device users when using their mobile devices at the first location. The method also has the step of generating the recommendation. The recommendation is generated at least in part based on the transactional history, and the recommendation recommends physical merchandise. The method has the further step of transmitting the recommendation to the mobile device. The mobile device displays the recommendation.

In an embodiment, the transactional history is media obtained by the user of the first mobile device while using the first mobile device at the first location.

In an embodiment, the transactional history is merchandise purchased by the user of the first mobile device while using the first mobile device at the first location.

In an embodiment, the transactional history includes media obtained at the first location by mobile device users other than the user of the first mobile device.

In an embodiment, the transactional history includes merchandise purchased at the first location by mobile device users other than the user of the first mobile device.

In an embodiment, the physical merchandise is sent to an address associated with the user of the first mobile device in response to user input on the first mobile device which accepts the recommendation.

In an embodiment, the method has the step of completing a purchase transaction based on user input on the mobile device wherein the physical merchandise is delivered to a shipping address of the user in response to completing the purchase transaction.

It is, therefore, an advantage of the present invention to provide a system and a method for generating a recommendation on a mobile device.

Another advantage of the present invention is to provide a system and a method for generating a recommendation on a mobile device that use a time, a location, a venue and/or an event to generate the recommendation.

And, another advantage of the present invention is to provide a system and a method for generating a recommendation on a mobile device that use a transactional history of the user.

Yet another advantage of the present invention is to provide a system and a method for generating a recommendation on a mobile device that use behavior of other users to generate the recommendation.

And, another advantage of the present invention is to provide a system and a method for generating a recommendation on a mobile device that recommends digital media, news and event information, editorial content and/or physical or digital merchandise.

Moreover, an advantage of the present invention is to provide a system and a method for generating a recommendation on a mobile device that determine current interests of the user and generate the recommendation accordingly.

Additional features and advantages of the present invention are described in, and will be apparent from, the detailed description of the presently preferred embodiments and from the drawings.

DETAILED DESCRIPTION OF THE PREFERRED EMBODIMENTS

The present invention generally relates to a system and a method for generating a recommendation on a mobile device. More specifically, the present invention relates to a system and a method for generating a recommendation on a mobile device that may use a time, a location, a venue and/or an event to generate the recommendation. Further, the system and the method for generating a recommendation on a mobile device may use an event database to determine the current interests of the user. Still further, the system and the method for generating a recommendation on a mobile device may use a transactional history of the user and/or behavior of other users to generate the recommendation. The system and the method for generating a recommendation on a mobile device may recommend, for example, digital media, news and event information, editorial content and/or physical or digital merchandise.

Figure 1:
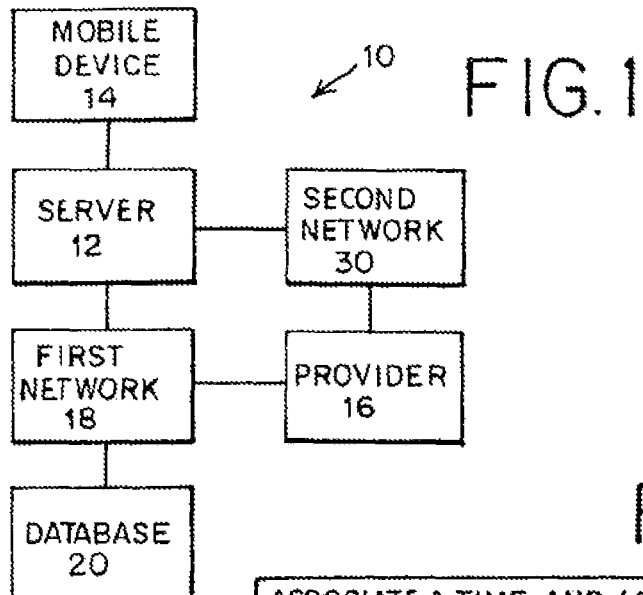
FIG. 1 illustrates a system for generating a recommendation on a mobile device in an embodiment of the present invention.

Referring now to the drawings wherein like numerals refer to like parts, FIG. 1 illustrates a system 10 which may have a server 12 for connecting a mobile device 14 to a first data communication network 18 (hereinafter "the first network 18"). The mobile device 14 may be, for example, a mobile cellular telephone, a personal digital assistant ("PDA"), a 4G mobile device, a 3G mobile device, a 2.5G mobile device, an internet protocol (hereinafter "IP") video cellular telephone, an ALL-IP electronic device, a laptop computer, a satellite radio receiver, a portable digital audio player, a portable digital video player and/or the like. The mobile device 14 may be connected to and/or may be in communication with the server 12. The mobile device 14 may be capable of transmitting, receiving, processing, accepting and/or displaying digital media. The mobile device 14 may have a display (not shown) for viewing, for consuming and/or for displaying the multimedia. The mobile device 14 may be any mobile device capable of transmitting, receiving, processing and/or displaying multimedia known to one having ordinary skill in the art.

The mobile device 14 may receive a recommendation. The recommendation may be digital media, news and event information, editorial content and/or physical or digital merchandise. The mobile device 14 may be any mobile device capable of transmitting, receiving, processing and/or displaying the recommendation known to one having ordinary skill in the art.

A database 20 may be connected to the first network 18. As a result, the database 20 may be connected to and/or may be accessible by the mobile device 14 and/or the server 12. The mobile device 14 may be remote with respect to the server 12 and/or the database 20. The database 20 may be local or may be remote with respect to the server 12. A provider 16 may be connected to the first network 18. The provider 16 may be, for example, a content service, a media store, a retail store, an advertiser, a ticket seller, a mobile network operator, an entertainment venue, a conference venue and/or the like. The present invention should not be limited to a specific embodiment of the provider 16. It should be understood that the provider 16 may be any provider as known to one of ordinary skill in the art.

The first network 18 may be, for example, an IP network, a wireless network, a wireline network, a local-area network, a wide-area network, a metropolitan area network, a paging network, a public switched telephone network and/or the like. The present invention should not be limited to a specific embodiment of the first network 18. It should be understood that the first network 18 may be any network capable of connecting and/or providing communication between the server 12 and the database 20 as known to one having ordinary skill in the art.

For example, the digital media may be a musical composition, a radio program, an audio book, an audio program, a television program, a movie, a music video, an animated work, a video program, a video game and/or a soundtrack and/or a video track of an audiovisual work, one or more digital photographs, a dramatic work, a film score and/or an opera and/or the like. The present invention should not be limited to a specific embodiment of the digital media. It should be understood that the digital media may be any digital media as known to one of ordinary skill in the art.

Figure 2:
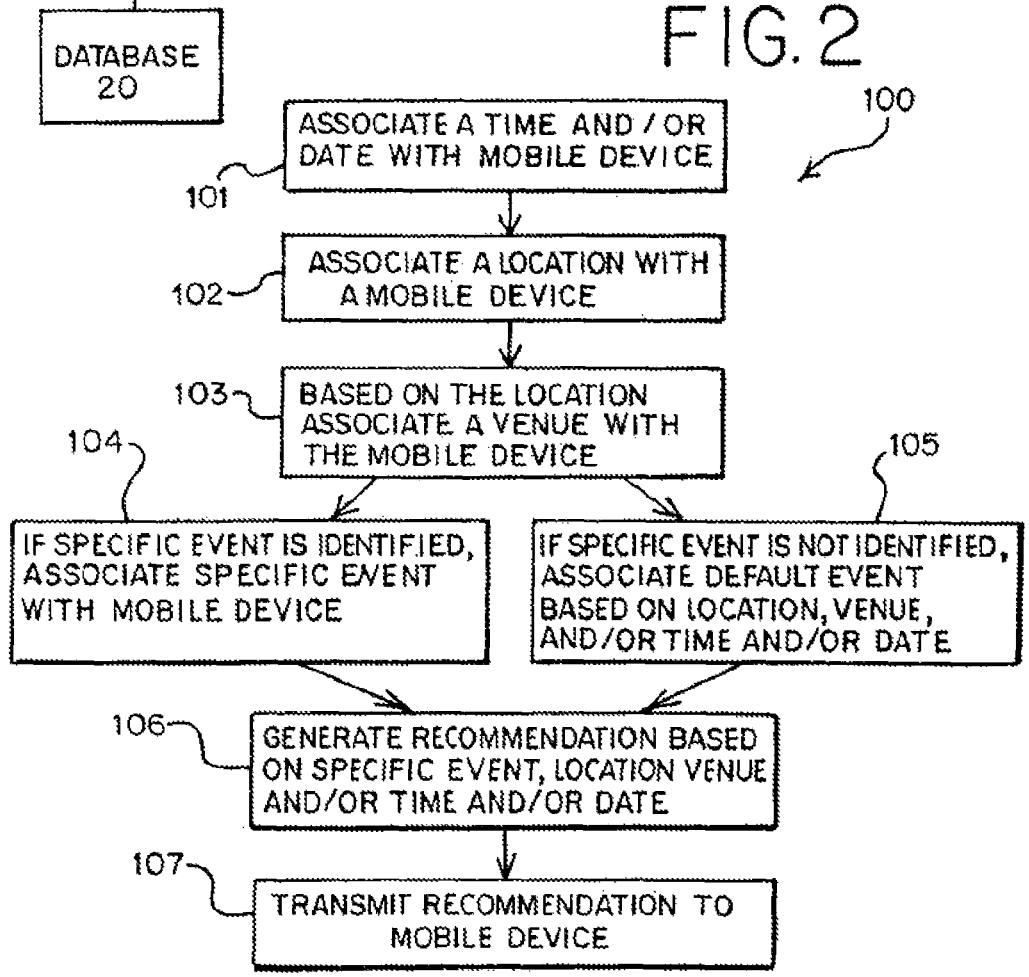
FIG. 2 illustrates a flowchart of a method for generating a recommendation on a mobile device in an embodiment of the present invention.

FIG. 2 generally illustrates a method 100 for generating a recommendation on a mobile device in an embodiment of the present invention. A time and/or date may be associated with the mobile device 14 as shown at step 101. The first network 18 may provide the time and/or date. Alternatively, the mobile device 14 may have a real time clock. The real time clock may be an integrated circuit that may provide the time and/or date. The real time clock may have a power source distinct from a power source of the mobile device 14. Alternatively, the time and/or date may be obtained from GPS signals to a GPS receiver located in the mobile device 14. It should be understood that the time and/or date may be obtained in any method as known to one of ordinary skill in the art.

A location may be associated with the mobile device 14 as shown at step 102. The location may be provided by the GPS receiver located in the mobile device 14. One or more GPS satellites may be positioned in orbit around earth and may provide the GPS signals to the GPS receiver. The GPS signals may provide coordinates of the GPS receiver. Therefore, the mobile device 14 may use the coordinates provided by the GPS receiver to identify the location of the mobile device 14. The location may be permanently recorded in order to establish a record of locations previously visited and/or the relative frequency of visits to particular locations.

The database 20 may identify a venue based on the location as shown at step 103. For example, the location may be used by the database to identify the venue as a home of the user, a stadium, a theater, an airport, a conference center, a shopping center, an auditorium and/or the like.

The database 20 may identify a specific event based on the location, the venue and/or the time and/or date as shown at step 104. The specific event may be associated with the mobile device 14. For example, if the mobile device 14 is located at a specific sporting event, the database may use the location, the venue and/or the time and/or date to determine the specific sporting event. As a further example, if the mobile device 14 is located at a specific music performance, the database may use the location, the venue, the time and/or date to determine the specific music performance.

If the specific event cannot be identified, a default event may be generated as shown at step 105. The default event may be based on the specific events associated with a similar location, similar venue and/or similar time and/or date. For example, if the database 20 does not have an entry for the location, the venue and/or the time and/or date, the default event may be associated with the mobile device 14 based on comparison of the location, the venue and/or the time and/or date of the mobile device 14 with a location, a venue information and/or a time and/or date of the specific events in the database 20. As further example, if the database 20 does not have an entry for the location, the default event may be an event currently occurring near to the location, i.e. a jazz concert occurring a quarter of a mile away; an event occurring at the location in the near future, i.e. a rock concert occurring in a week; and/or a typical usage for the identified venue, i.e. basketball if the venue is a sports stadium.

Association of the mobile device 14 with the specific event may be transmitted via the server 12 and/or the first network 18. Based on the association of the mobile device 14 with the specific event, the recommendation may be generated and/or may be transmitted to the mobile device 14 as shown at steps 106 and 107, respectively. The recommendation may be generated by the database 20 and/or the provider 16. The recommendation may be transmitted to the mobile device 14 by the first network 18. Alternatively, the recommendation may be transmitted from the provider 16 by a second data communication network 30 (hereinafter "the second network 30"). The recommendation may be transmitted from the second network 30 to the mobile device 14 via the server 12. Thus, the mobile device 14 may obtain the association of the mobile device 14 with the specific event via the first network 18 and may subsequently obtain the recommendation from the provider 16 via the second network 30.

If the user accepts the recommendation, a subject of the recommendation may be transmitted to the mobile device 14. For example, digital media, news and event information, editorial content and/or digital merchandise may be transmitted to the mobile device 14. The subject of the recommendation may be transmitted to the mobile device 14 by the first network 18 and/or the second network 30. Acceptance of the recommendation may complete a transaction to order and/or buy physical merchandise to be delivered to a shipping address of the user. The delivery of the subject of the recommendation may require the user to complete a financial transaction and/or pay a fee associated with the content.

The second network 30 may be, for example, an IP network, a wireless network, a wireline network, a personal area network, a local-area network, a metropolitan area network, a wide-area network, a paging network, a public switched telephone network and/or the like. The mobile device 14 may be remote with respect to and/or may be remotely connected to the second network 30. The present invention should not be limited to a specific embodiment of the second network 30. It should be understood that the second network 30 may be any network capable of connecting and/or providing communication between the provider 16 and the mobile device 14 as known to one having ordinary skill in the art.

The recommendation may be based on the specific event. For example, if the specific event is a concert by a specific musician, the recommendation may recommend ringtones of music by the specific musician. As a further example, if the event is a sporting event of a specific team, the recommendation may recommend news regarding the specific team. Generation of the recommendation based on the specific event may avoid problems that may arise from use of the venue alone, such as, for example, recommendation of sports information if a sporting venue is used for a concert, if a music theater is used for a conference and/or the like.

The recommendation may be based on general location guidelines. The general location guidelines may compare the location of the mobile device 14 relative to another location, such as, for example, home of the user, retail locations, restaurants and/or the like. For example, if the user is over one hundred miles from home, the recommendation may be a recommendation of local restaurant information. As a further example, if the user is within one mile of a movie theater, the recommendation may be a recommendation of a current movie trailer. As yet another example, the recommendation may be based on a number of visits to the location, such as recommendation of content associated with nearby tourist attractions and/or points of interest if the current location is identified as new to the user. The location may be identified as new to the user if the location has not been frequently visited in the past or has never been visited in the past, according to the stored records of previous locations.

The database 20 may have a transactional history of the user. The transactional history of the user may provide transactions of the user when the user is present at the location and/or the venue at the time and/or date. The recommendation may be generated based on the transactional history of the user. For example, if the user frequently downloads news information if the user is located at the airport in the morning, the recommendation may recommend the news information. As a further example, if the user frequently downloads merchandise information if the user is located at home in the evening, the recommendation may be a recommendation of the merchandise information.

The database 20 may have a transactional history of other users. The transactional history of the other users may provide transactions of the other users when the other users were present at the location and/or the venue of the user. The transactional history of the other users may provide transactions of the other users when the other users were present at events similar to the specific event of the user and/or locations similar to the location of the user. The recommendation may be generated based on the transactional history of the other users.

For example, the other users may frequently download football statistics for a specific team if present at the venue that is the home stadium of that team. Therefore, if the mobile device 14 is located at the venue that is the home stadium of the specific team, the recommendation to the user may be a recommendation of the football statistics of the specific team. As a further example, the other users may frequently download digital media of jazz music if located at Bourbon Street in New Orleans. Therefore, if the mobile device 14 is located at Bourbon Street in New Orleans, the recommendation may be a recommendation of the digital media of jazz music. As another example, the other users may frequently download weather updates if present at an airport. Therefore, if the mobile device 14 is located at the airport, the recommendation may be a recommendation of the weather updates.

It should be understood that various changes and modifications to the presently preferred embodiments described herein will be apparent to those skilled in the art. Such changes and modifications may be made without departing from the spirit and scope of the present invention and without diminishing its attendant advantages. Therefore, it is intended that such changes and modifications be covered by the appended claims.

We claim:

1. A method for generating a recommendation for a mobile device of a user, the method comprising:
   determining that a mobile device is within a geographic area;
   determining a venue within the geographic area based on the mobile device's location;
   determining whether an event is occurring at the venue on a current date;
   in response to determining that the event is occurring at the venue on the current date, transmitting a first recommendation including information about the event to the mobile device; and
   in response to determining that the event is not occurring at the venue on the current date, transmitting a second recommendation, wherein the second recommendation comprises a default event, a default event time, or a default event date.

2. The method of claim 1, wherein the first recommendation is further based at least in part on a number of visits to the venue.

3. The method of claim 1, wherein at least one of the first and second recommendations is further based at least in part on a transactional history of a user of the mobile device.

4. The method of claim 1, wherein at least one of the first and second recommendations is further based at least in part on a transactional history of other users.

5. The method of claim 1, wherein the first recommendation includes content associated with the venue.

6. The method of claim 1, wherein the mobile device's location is determined using a global positioning system.

7. The method of claim 1, wherein the first recommendation recommends digital content to be played on the mobile device.

8. The method of claim 1, wherein the first recommendation recommends digital content to be displayed on a display of the mobile device.

9. The method of claim 1, wherein the first recommendation recommends physical merchandise.

10. The method of claim 1, further comprising storing a record of previous locations of the mobile device, wherein the first recommendation is further based at least in part on the record of previous locations.

11. The method of claim 1, further comprising determining a current time, wherein the current time is considered in determining whether to recommend the event to the user.

12. A system comprising:
    a database configured to store information about venues and events at the venues; and
    a processor configured to:
       determine that a mobile device is within a geographic area;
       determine a venue within the geographic area based on the mobile device's location;
       determine whether an event is occurring at the venue on a current date;
       in response to determining that the event is occurring at the venue on the current date, provide a first recommendation including information about the event to the mobile device; and
       in response to determining that the event is not occurring at the venue on the current date, provide a second recommendation, wherein the second recommendation comprises a default event, a default event time, or a default event date.

13. The system of claim 12, wherein at least one of the first and second recommendations is further based at least in part on a transactional history of a user of the mobile device.

14. The system of claim 12, wherein the first recommendation includes content associated with the venue.

15. The system of claim 12, wherein the first recommendation recommends digital content to be played on the mobile device.

16. A non-transitory computer-readable medium having stored therein program instructions that, when executed by at least one processor, cause the at least one processor to:
    determine that a mobile device is within a geographic area;
    determine a venue within the geographic area based on the mobile device's location;
    determine whether an event is occurring at the venue on a current date;

in response to determining that the event is occurring at the venue on the current date, transmit a first recommendation including information about the event to the mobile device; and in response to determining that the event is not occurring at the venue on the current date, transmit a second recommendation, wherein the second recommendation comprises a default event, a default event time, or a default event date.

17. The non-transitory computer-readable medium of claim 16, wherein the first recommendation is further based at least in part on a number of visits to the venue.

18. The non-transitory computer-readable medium of claim 16, wherein at least one of the first and second recommendations is further based at least in part on a transactional history of a user of the mobile device.

19. The non-transitory computer-readable medium of claim 16, wherein at least one of the first and second recommendations is further based at least in part on a transactional history of other users.

20. The non-transitory computer-readable medium of claim 16, wherein the first recommendation includes content associated with the venue.

\* \* \* \* \*